US012726616B2

(12) United States Patent
Andrivon et al.

(10) Patent No.: US 12,726,616 B2
(45) Date of Patent: Sep. 1, 2026

(54) METHOD AND DEVICE OF INTRA-PREDICTING TARGET BLOCK OF VIDEO PICTURE BASED ON TEMPLATE MATCHING, AND STORAGE MEDIUM

(71) Applicant: BEIJING XIAOMI MOBILE SOFTWARE CO., LTD., Beijing (CN)

(72) Inventors: Pierre Andrivon, Beijing (CN); Fabrice Leléannec, Beijing (CN); Miloš Radosavljević, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 7 days.

(21) Appl. No.: 19/115,525

(22) PCT Filed: Apr. 24, 2023

(86) PCT No.: PCT/CN2023/090450
§ 371 (c)(1),
(2) Date: Mar. 26, 2025

(87) PCT Pub. No.: WO2024/066321
PCT Pub. Date: Apr. 4, 2024

(65) Prior Publication Data

US 2026/0106965 A1 Apr. 16, 2026

(30) Foreign Application Priority Data

Sep. 27, 2022 (EP) .................................... 22306422

(51) Int. Cl.
*H04N 19/105* (2014.01)
*H04N 19/154* (2014.01)
(Continued)

(52) U.S. Cl.
CPC ......... *H04N 19/105* (2014.11); *H04N 19/154* (2014.11); *H04N 19/176* (2014.11); *H04N 19/593* (2014.11)

(58) Field of Classification Search
CPC .. H04N 19/105; H04N 19/154; H04N 19/176; H04N 19/593
See application file for complete search history.

(56) References Cited

U.S. PATENT DOCUMENTS

2010/0246675 A1* 9/2010 Gharavi-Alkhansari .................... H04N 19/176 375/E7.026
2022/0217335 A1* 7/2022 Wang .................. H04N 19/105

FOREIGN PATENT DOCUMENTS

CN 111586420 A 8/2020

OTHER PUBLICATIONS

International Patent Application No. PCT/CN2023/090450 International Search Report and Written Opinion dated Aug. 1, 2023, 8 pages.

(Continued)

*Primary Examiner* — Kathleen V Nguyen
(74) *Attorney, Agent, or Firm* — Cozen O'Connor

(57) ABSTRACT

A method of intra-predicting a target block of a video picture based on template matching that compares a target template patch with a candidate reference template patch, the method including: determining a candidate reference block neighborhood according to target block neighborhood reconstructed samples availability and according to a geometry transform type; obtaining the candidate reference template patch by applying a geometry transform, identified by the geometry transform type, on the candidate reference block neighborhood; selecting a candidate reference block with a minimum cost obtained by comparing the candidate reference template patch and the target template patch; and (Continued)

generating an intra-prediction block for the target block by applying the geometry transform, identified by the geometry transform type associated with the selected candidate reference block, to the selected candidate reference block.

20 Claims, 16 Drawing Sheets

(51) Int. Cl.
*H04N 19/176* (2014.01)
*H04N 19/593* (2014.01)

(56) References Cited

OTHER PUBLICATIONS

European Patent Application No. 22306422.1 Search Report dated Feb. 6, 2023, 10 pages.

* cited by examiner

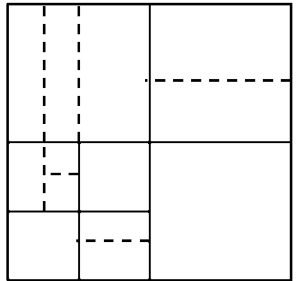
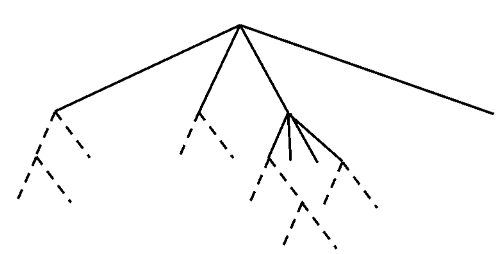
Fig. 3
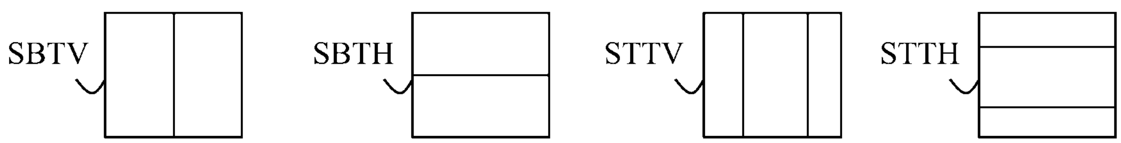
Fig. 4

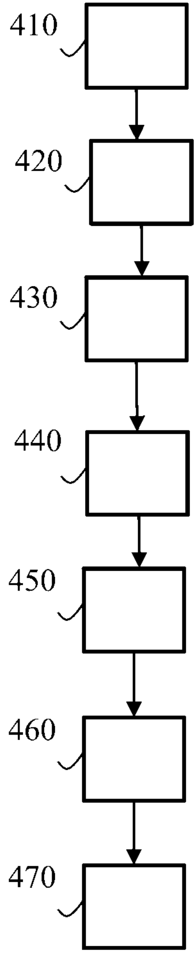
Fig. 10

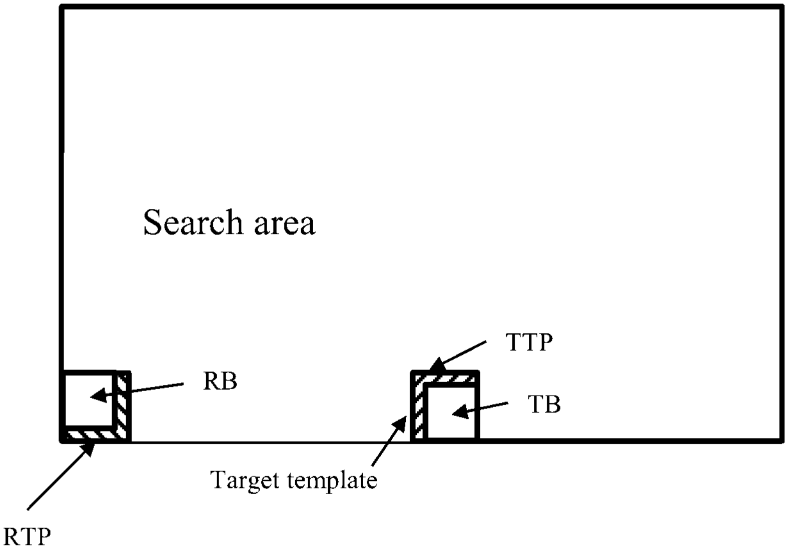
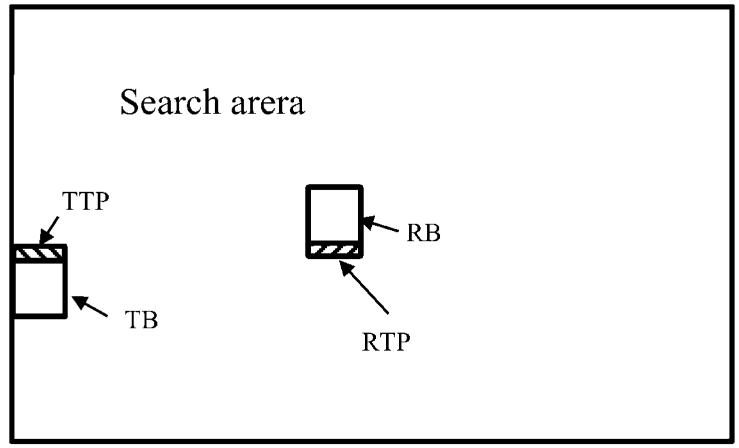
Fig. 11

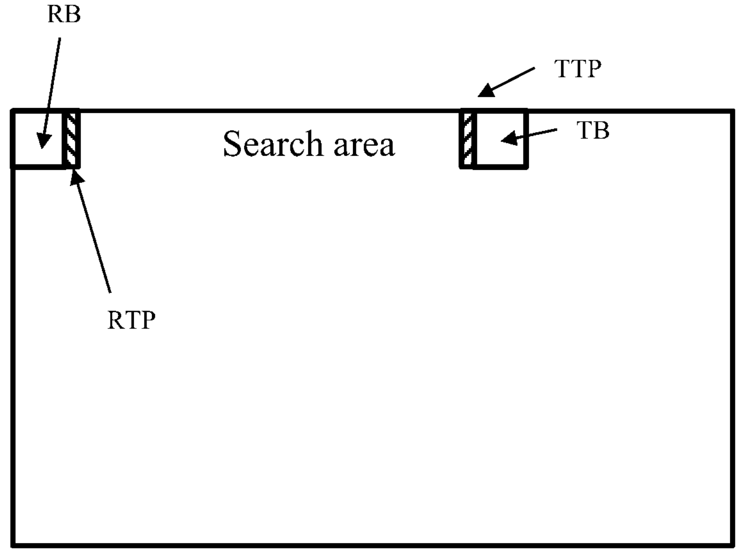
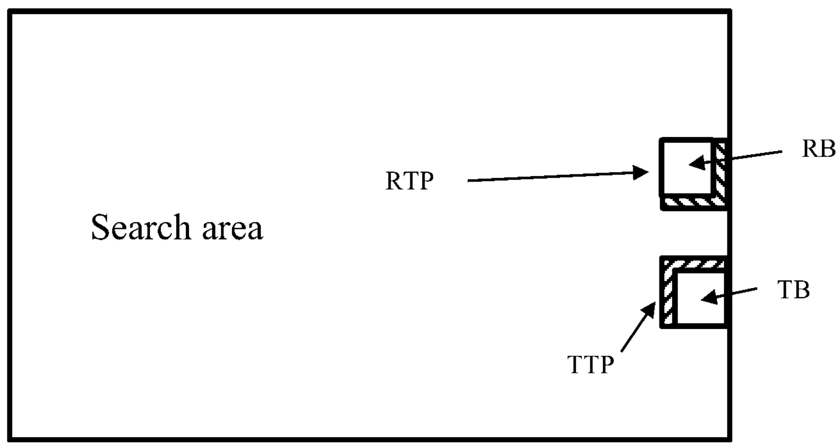
Fig. 12

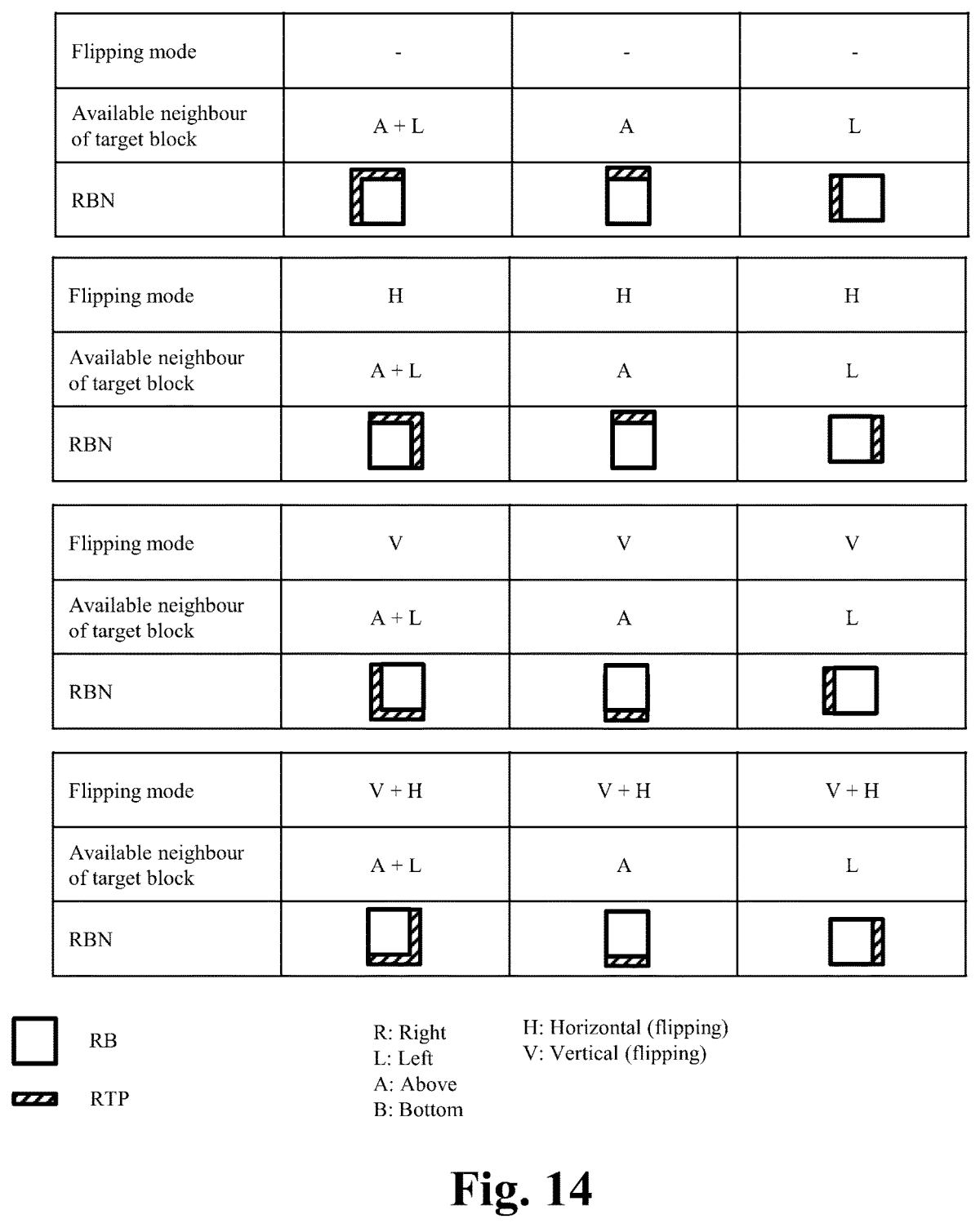

| Flipping mode | - | - | - |
|---|---|---|---|
| Available neighbour of target block | A + L | A | L |
| RBN | | | |

| Flipping mode | H | H | H |
|---|---|---|---|
| Available neighbour of target block | A + L | A | L |
| RBN | | | |

| Flipping mode | V | V | V |
|---|---|---|---|
| Available neighbour of target block | A + L | A | L |
| RBN | | | |

| Flipping mode | V + H | V + H | V + H |
|---|---|---|---|
| Available neighbour of target block | A + L | A | L |
| RBN | | | |

RB

RTP

R: Right
L: Left
A: Above
B: Bottom

H: Horizontal (flipping)
V: Vertical (flipping)

Fig. 14

| Rotation mode (°) | 0 | 0 | 0 |
|---|---|---|---|
| Available neighbour of target block | A + L | A | L |
| RBN | | | |

| Rotation mode (°) | 90 | 90 | 90 |
|---|---|---|---|
| Available neighbour of target block | A + L | A | L |
| RBN | | | |

| Rotation mode (°) | 180 | 180 | 180 |
|---|---|---|---|
| Available neighbour of target block | A + L | A | L |
| RBN | | | |

| Rotation mode (°) | 270 | 270 | 270 |
|---|---|---|---|
| Available neighbour of target block | A + L | A | L |
| RBN | | | |

RB

RTP

R: Right
L: Left
A: Above
B: Bottom

Fig. 15

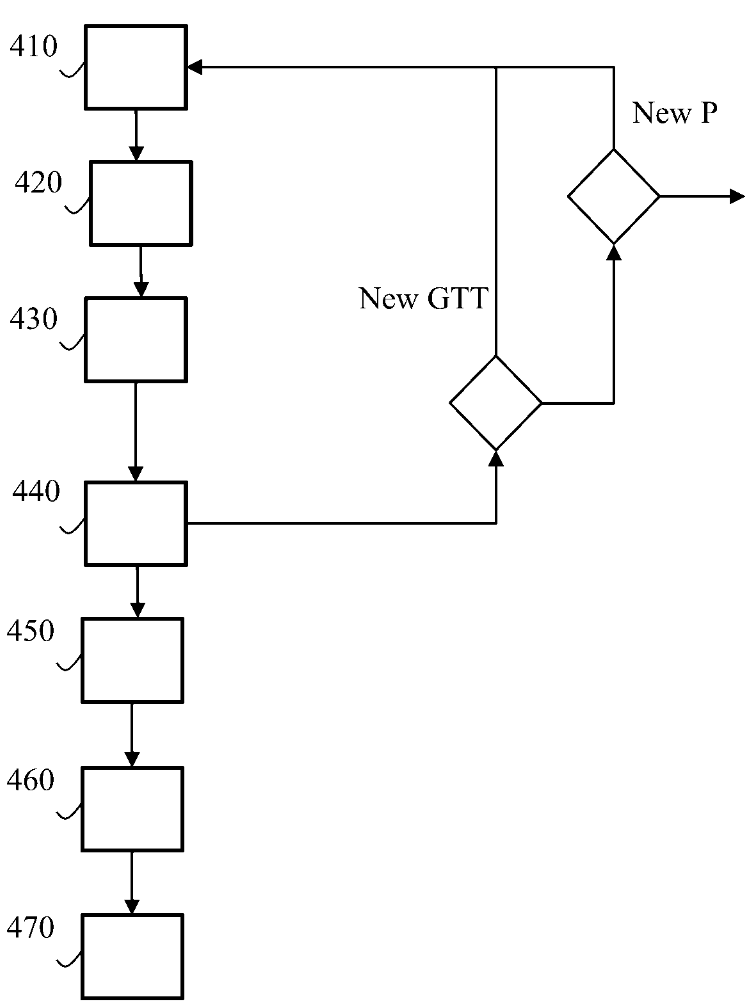
Fig. 17

| coding_unit( x0, y0, cbWidth, cbHeight, cqtDepth, treeType, modeType ) { | Descriptor |
|---|---|
| if( CuPredMode[ chType ][ x0 ][ y0 ] = = MODE_INTRA \|\| CuPredMode[ chType ][ x0 ][ y0 ] = = MODE_PLT ) { | |
| if( treeType = = SINGLE_TREE \|\| treeType = = DUAL_TREE_LUMA ) { | |
| if( pred_mode_plt_flag ) | |
| palette_coding( x0, y0, cbWidth, cbHeight, treeType ) | |
| else { | |
| if( sps_bdpcm_enabled_flag && cbWidth <= MaxTsSize && cbHeight <= MaxTsSize ) | |
| intra_bdpcm_luma_flag | ae(v) |
| if( intra_bdpcm_luma_flag ) | |
| intra_bdpcm_luma_dir_flag | ae(v) |
| else { | |
| if( sps_intra_tmp_enabled_flag ) | |
| intra_tmp_flag | ae(v) |
| if( intra_tmp_flag ) | |
| intra_tmp_flip_type | ae(v) |
| else { | |
| if( sps_mip_enabled_flag ) | |
| intra_mip_flag | ae(v) |
| if( intra_mip_flag ) { | |
| intra_mip_transposed_flag[ x0 ][ y0 ] | ae(v) |
| intra_mip_mode[ x0 ][ y0 ] | ae(v) |
| } else { | |
| if( sps_mrl_enabled_flag && ( ( y0 % CtbSizeY ) > 0 ) ) | |
| intra_luma_ref_idx | ae(v) |
| if( sps_isp_enabled_flag && intra_luma_ref_idx = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| intra_subpartitions_mode_flag | ae(v) |
| if( intra_subpartitions_mode_flag = = 1 ) | |
| intra_subpartitions_split_flag | ae(v) |
| if( intra_luma_ref_idx = = 0 ) | |
| intra_luma_mpm_flag[ x0 ][ y0 ] | ae(v) |
| if( intra_luma_mpm_flag[ x0 ][ y0 ] ) { | |
| if( intra_luma_ref_idx = = 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| } | |
| } | |

Fig. 19

METHOD AND DEVICE OF INTRA-PREDICTING TARGET BLOCK OF VIDEO PICTURE BASED ON TEMPLATE MATCHING, AND STORAGE MEDIUM

CROSS-REFERENCE TO RELATED APPLICATION

This application is the US national phase application of International Application No. PCT/CN2023/090450, filed on Apr. 24, 2023, which claims the benefit of priority to European Patent Application No. 22306422.1, filed Sep. 27, 2022, the entire content of which is incorporated herein by reference.

FIELD

The present disclosure generally relates to video picture encoding and decoding. Particularly, but not exclusively, the technical field of the present disclosure is related to a method and a device of intra-predicting a target block of a video picture based on template matching, and a storage medium.

BACKGROUND

Template matching is a large field in image and video processing. However it was historically dismissed from video standardization activities because of its inherent complexity. The template matching has been applied to Intra prediction mode coding with its introduction in ECM (Algorithm description of Enhanced Compression Model 5 (ECM 5) with the contribution JVET-U0048 (Evaluation of Template Matching Prediction for VVC, K. Naser et al, JVET-U0048, January 2021 and EE2: Intra Template Matching, K. Naser et al, JVET-V0130, April 2021). Indeed, ECM is less demanding in terms of affordability of complexity as compression performance prevail in this exploratory stage before a hypothetical standardization stage per se.

A target block neighborhood TBN (or a candidate reference block neighborhood RBN) defined in the prior art limits matching possibilities. It consists of a horizontal (when above reconstructed samples are available) and/or vertical (when left reconstructed samples are available) band of 4 samples aside a target block which are matched against candidate reference template patch (band of 4 samples aside a candidate reference block) defined in a search area.

SUMMARY

According to a first aspect of the present disclosure, there is provided a method of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area, the method including:

determining the candidate reference block neighborhood according to the target block neighborhood reconstructed samples availability, and according to a geometry transform type;

obtaining the reconstructed samples of the candidate reference template patch by applying a geometry transform, identified by the geometry transform type, on the reconstructed samples in the candidate reference block neighborhood;

associating a cost with the candidate reference block obtained by comparing the reconstructed samples of the candidate reference template patch and the reconstructed samples of the target template patch;

selecting the candidate reference block with a minimum cost, said selected candidate reference block being associated with a geometry transform type identifying a geometry transform; and generating an intra-prediction block for the target block by applying the geometry transform, identified by the geometry transform type associated with the selected candidate reference block, to reconstructed samples of the selected candidate reference block.

According to a second aspect of the present disclosure, there is provided a non-transitory computer-readable storage medium carrying instructions that, when executed by a processor of a device, the device is caused to perform a method of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area, the method including:

determining the candidate reference block neighborhood according to the target block neighborhood reconstructed samples availability, and according to a geometry transform type;

obtaining the reconstructed samples of the candidate reference template patch by applying a geometry transform, identified by the geometry transform type, on the reconstructed samples in the candidate reference block neighborhood;

associating a cost with the candidate reference block obtained by comparing the reconstructed samples of the candidate reference template patch and the reconstructed samples of the target template patch;

selecting the candidate reference block with a minimum cost, said selected candidate reference block being associated with a geometry transform type identifying a geometry transform; and generating an intra-prediction block for the target block by applying the geometry transform, identified by the geometry transform type associated with the selected candidate reference block, to reconstructed samples of the selected candidate reference block.

According to a third aspect of the present disclosure, there is provided a device of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area, the device including: a processor; and a memory for storing instructions executable by the processor; wherein the processor is configured to:

determine the candidate reference block neighborhood according to the target block neighborhood reconstructed samples availability, and according to a geometry transform type;

obtain the reconstructed samples of the candidate reference template patch by applying a geometry transform, identified by the geometry transform type, on the reconstructed samples in the candidate reference block neighborhood;

associate a cost with the candidate reference block obtained by comparing the reconstructed samples of the candidate reference template patch and the reconstructed samples of the target template patch;

select the candidate reference block with a minimum cost, the selected candidate reference block being associated with a geometry transform type identifying a geometry transform; and generate an intra-prediction block for the target block by applying the geometry transform, identified by the geometry transform type associated with the selected candidate reference block, to reconstructed samples of the selected candidate reference block.

The specific nature of at least one of the embodiments as well as other objects, advantages, features and uses of said at least one of embodiments will become evident from the following description of examples taken in conjunction with the accompanying drawings.

BRIEF DESCRIPTION OF THE DRAWINGS

Reference will now be made, by way of example, to the accompanying drawings which show embodiments of the present disclosure.

FIG. 3 shows a CTU division in accordance with VVC.

FIG. 4 shows split modes supported in the multi-type tree partitioning in accordance with VVC.

FIG. 10 illustrates schematically a block diagram of a method 400 of intra-predicting a target block of a video picture based on template matching in accordance with an embodiment of the present disclosure.

FIG. 11 illustrates search area adjustment at video picture or search area boundaries in accordance with an embodiment of the present disclosure.

FIG. 12 illustrates search area adjustment at video picture or search area boundaries in accordance with an embodiment of the present disclosure.

FIG. 14 illustrates some examples of neighborhood template determination according to flipping (geometry transform type) in accordance with an embodiment of the present disclosure.

FIG. 15 illustrates some examples of neighborhood template determination according to rotations (geometry transform type) in accordance with an embodiment of the present disclosure.

FIG. 17 illustrates schematically a block diagram of method 400 in accordance with an embodiment.

FIG. 19 illustrates a syntax element structure used for signaling a geometry transform type in accordance with embodiment.

Similar or same elements are referenced with the same reference numbers.

DETAILED DESCRIPTION

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the present disclosure is intended to cover all modifications, equivalents, and alternatives falling within the spirit and scope of the present disclosure.

The present section is intended to introduce the reader to various aspects of art, which may be related to various aspects of at least one embodiment of the present disclosure that is described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-I/en, low-level and high-level picture partitioning are provided to divide a video picture into picture areas so-called Coding-Tree Units (CTU) which size may be typically between 16×16 and 64×64 pixels for HEVC and 32×32, 64×64, or 128×128 pixels for VVC.

The CTU division of a video picture forms a grid of fixed size CTUs, namely a CTU grid, which upper and left bounds spatially coincide with the top and left borders of the video picture. The CTU grid represents a spatial partition of the video picture.

In VVC and HEVC, the CTU size (CTU width and CTU height) of all the CTUs of a CTU grid equals a same default CTU size (default CTU width CTU DW and default CTU height CTU DH). For example, the default CTU size (default CTU height, default CTU width) may equal to 128 (CTU DW-CTU DH=128). A default CTU size (height, width) is encoded into the bitstream, for example at a sequence level in the Sequence Parameter Set (SPS).

The spatial position of a CTU in a CTU grid is determined from a CTU address ctuAddr defining a spatial position of the top-left corner of a CTU from an origin. As illustrated on FIG. 1, the CTU address may define the spatial position from the top-left corner of a higher-level spatial structure S containing the CTU.

A coding tree is associated with each CTU to determine a tree-division of the CTU.

Figures 1, 2:
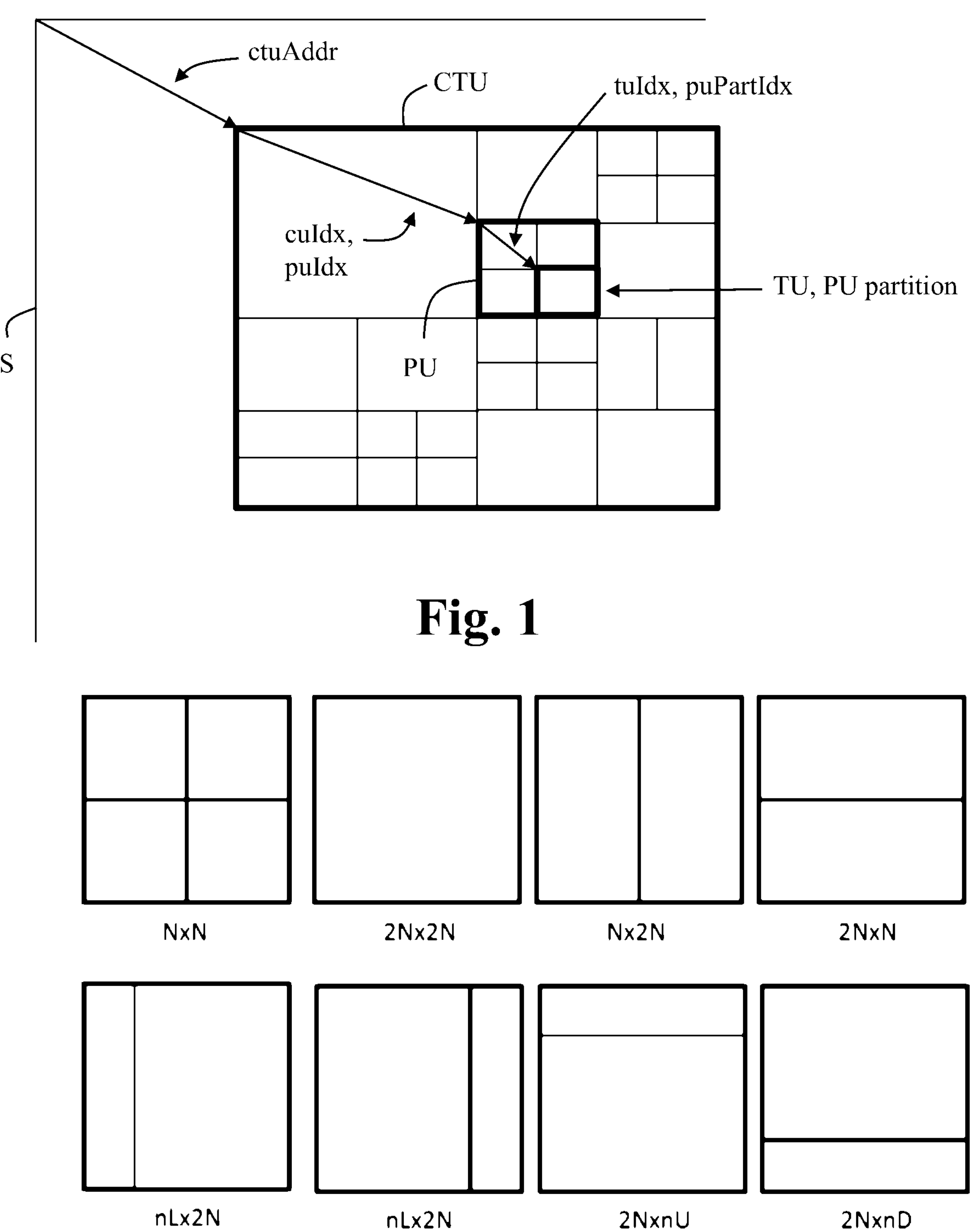
FIG. 1 shows a coding-tree unit in accordance with HEVC.
FIG. 2 shows partitioning coding units into prediction units in accordance with HEVC.

As illustrated on FIG. 1, in HEVC, the coding tree is a quad-tree division of a CTU, where each leaf is called a Coding Unit (CU). The spatial position of a CU in the video picture is defined by a CU index cuIdx indicating a spatial position from the top-left corner of the CTU. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU is defined by a PU partition index puPartIdx defining a spatial position from the top-left corner of a PU. Each PU is assigned some intra or inter prediction data.

The coding mode intra or inter is assigned on the CU level. That means that a same intra/inter coding mode is assigned to each PU of a CU, though the prediction parameters varying from PU to PU.

A CU may be also spatially partitioned into one or more Transform Units (TU), according to a quad-tree called the transform tree. Transform Units are the leaves of the transform tree. The spatial position of a TU in the video picture is defined by a TU index tuIdx defining a spatial position from the top-left corner of a CU. Each TU is assigned some transform parameters. The transform type is assigned on the TU level, and 2D separate transform is performed at TU level during the coding or decoding of a picture block.

The PU Partition types existing in HEVC are illustrated on FIG. 2. They include square partitions (2N×2N and N×N), which are the only ones used in both Intra and Inter predicted CUS, symmetric non-square partitions (2N×N, N×2N, used only in Inter predicted CUs), and asymmetric Partitions (used only in Inter predicted CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

As illustrated on FIG. 3, in VVC, the coding tree starts from a root node, i.e. the CTU. Next, a quad-tree (or quaternary tree) split divides the root node into 4 nodes corresponding to 4 sub-blocks of equal sizes (solid lines). Next, the quaternary tree (or quad-tree) leaves can then be further partitioned by a so-called multi-type tree, which involves a binary or ternary split according to one of 4 split modes illustrated on FIG. 4. These split types are the vertical and horizontal binary split modes, noted SBTV and SBTH and the vertical and horizontal ternary split modes SPTTV and STTH.

The leaves of the coding tree of a CTU are CU in the case of a joint coding tree shared by luma and chroma components.

Contrary to HEVC, in VVC, in most cases, CU, PU and TU have equal size, which means coding units are generally not partitioned into PU or TU, except in some specific coding modes.

Figure 5:
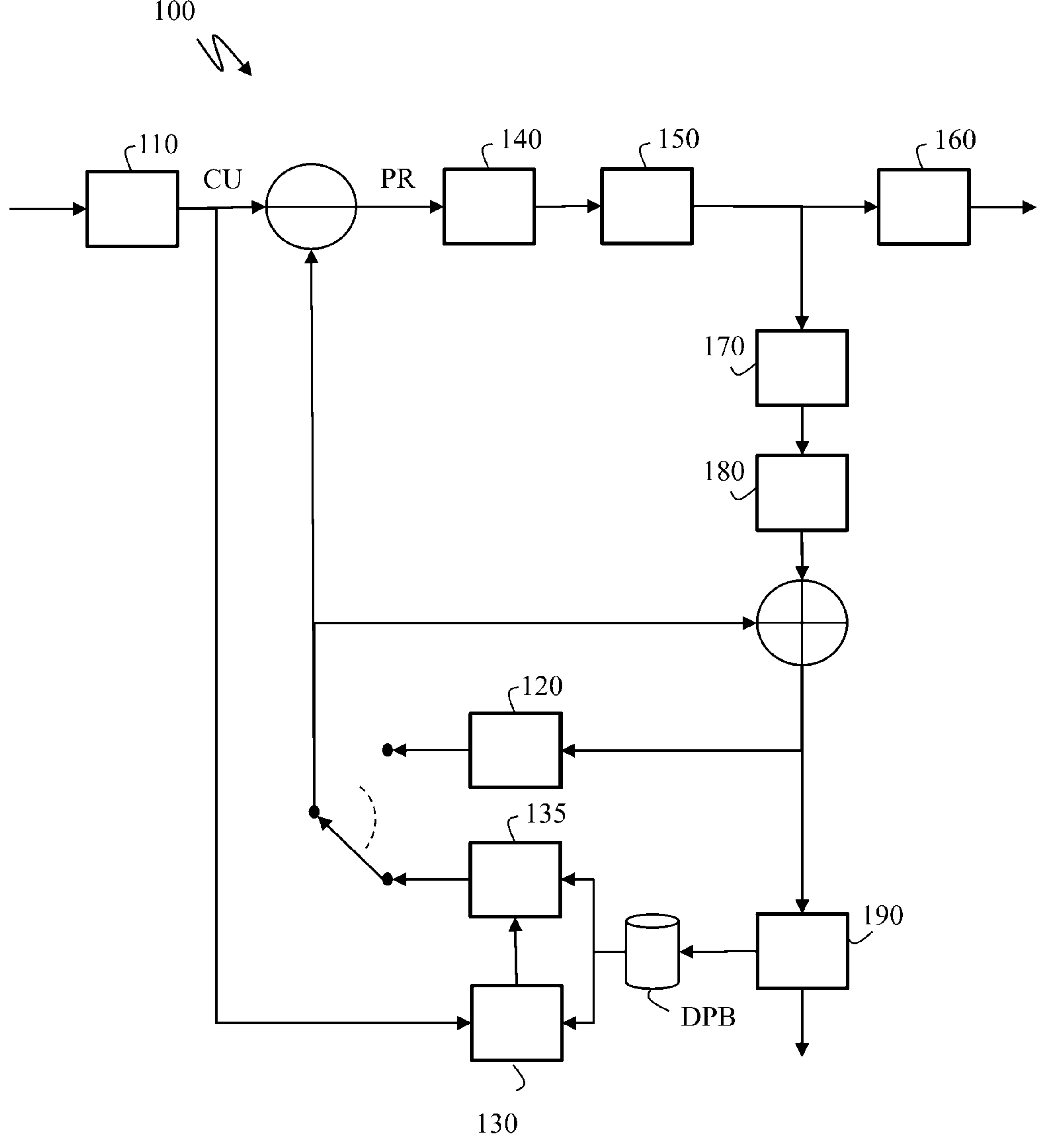
FIG. 5 shows a schematic block diagram of steps of a method 100 of encoding a video picture VP in accordance with prior art.
Figures 6, 7:
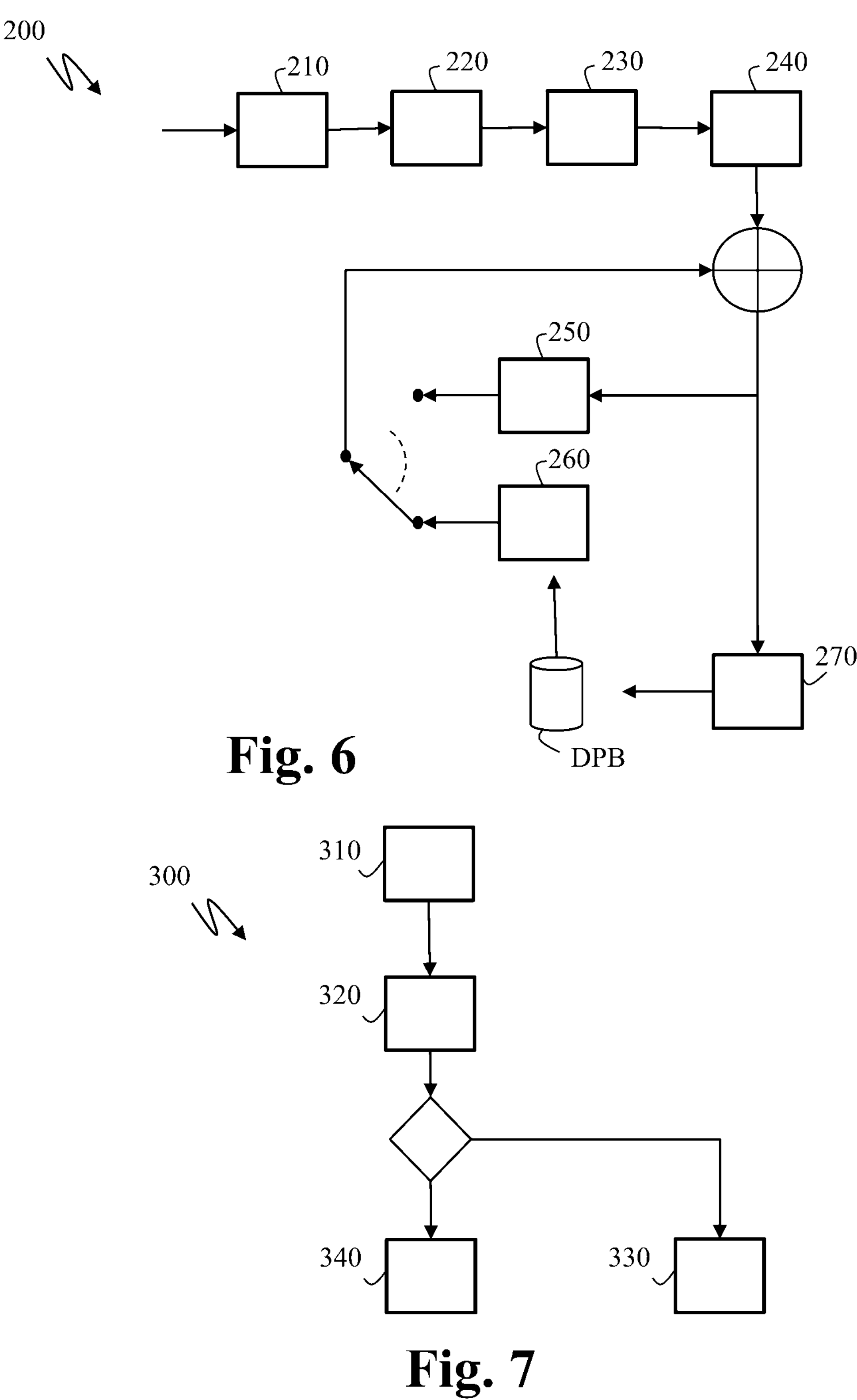
FIG. 6 shows a schematic block diagram of steps of a method 200 of decoding a video picture VP in accordance with prior art.
FIG. 7 illustrates a block diagram of a method 300 of intra template matching predicting a target block of a video picture in accordance with prior art.

FIGS. 5 and 6 provide an overview of video encoding/decoding methods used in current video standard compression systems like VVC for example.

FIG. 5 shows a schematic block diagram of steps of a method 100 of encoding a video picture VP in accordance with prior art.

In step 110, a video picture VP is partitioned into a CTU grid and partitioning information data is signaled into a bitstream B. A coding tree is associated with each CTU of the CTU grid, each CU of a coding tree associated with each CTU being a block of samples of the video picture VP. In short, a CU of a CTU is a block.

CTUs of the CTU grid are considered along a scanning order, usually a raster scan order of the video picture. Each block of a CTU is also considered along a scanning order, usually a raster scan order of blocks of the CTU.

Each block of each CTU is then encoded using either an intra or inter prediction coding mode.

Intra prediction (step 120) consists in predicting a current block by means of a predicted block based on already encoded, decoded and reconstructed samples located around the current block, typically on the top and on the left of the current block. Intra prediction is performed in the spatial domain.

In inter prediction mode, motion estimation (step 130) and motion compensation (135) are performed. Motion estimation searches, in one or more reference video picture(s) used to predictively encode the current video picture, a candidate reference block that is a good predictor of the current block. For instance, a good predictor of the current block is a predictor which is similar to the current block. The output of the motion estimation step 130 is one or more motion vectors and reference picture index (or indices) associated to the current block. Next, motion compensation (step 135) obtains a predicted block by means of the motion vector(s) and reference picture index (indices) determined by the motion estimation step 130. Basically, the block belonging to a selected reference picture and pointed to by a motion vector may be used as the predicted block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the predicted block samples.

Prediction information data is signaled in the bitstream B. The prediction information may comprise a prediction mode, prediction information coding mode, intra prediction mode or motions vector(s) and reference picture index (or indices) and any other information used for obtaining a same predicted block at the decoding side.

The method 100 selects one of the intra mode or inter coding mode by optimizing a rate-distortion trade-off taking into account the encoding of a prediction residual block calculated, for example, by subtracting a candidate predicted block from the current block, and the signaling of prediction information data required for determining said candidate predicted block at the decoding side.

Usually, the best prediction mode is given as being the prediction mode of a best coding mode p* for a current block given by:

$$p* = \underset{p \in P}{\operatorname{Argmin}} \{RD_{cost}(p)\} \quad (1)$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda \cdot R(p).$$

D(p) is the distortion between the current block and a reconstructed block obtained after encoding/decoding the current block with the candidate coding mode p, R (p) is a rate cost associated with the coding of the current block with coding mode p, and A is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best predicted block from the current block. The prediction residual block PR is then transformed (step 140) by using, for example, a DCT (discrete cosine transform) or DST (Discrete Sinus transform) type transform, and the obtained transformed coefficient block is quantized (step 150).

In variant, the method 100 may also skip the transform step 140 and apply quantization directly to the prediction residual block PR, according to the so-called transform-skip coding mode.

Quantized transform coefficient block (or quantized prediction residual block) is entropy encoded into the bitstream B (step 160).

Next, the quantized transform coefficient block (or the quantized residual block) is de-quantized (step 170) and inverse transformed (180) (or not), leading to a decoded prediction residual block. The decoded prediction residual block and the predicted block are then combined, typically summed, which provides the reconstructed block.

Other information data may also be entropy encoded for encoding a current block of the video picture VP.

In-loop filters (step 190) may be applied to a reconstructed picture (comprising reconstructed blocks) to reduce compression artefacts. Loop filter may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next video picture to encode.

FIG. 6 shows a schematic block diagram of steps of a method 200 of decoding a video picture VP in accordance with prior art.

In step 210, partitioning information data, prediction information data and quantized transform coefficient block (or quantized residual block) are obtained by entropy decoding a bitstream B.

Partitioning information data defines a CTU grid (arrangement) over the video picture. The CTU grid splits the video picture VP into multiple CTUs. CTUs of the CTU grid are considered along a scanning order, usually a raster scan order of the video picture VP. Blocks of a considered CTU are also considered along a scanning order, usually a raster scan order of blocks of the CTU.

Other information data may also be decoded from the bitstream B for decoding a current block of a current CTU of CTU grid.

In step 220, each current block of a current CTU is entropy decoded.

Each decoded current blocks may be either a quantized transform coefficient block or quantized prediction residual block.

In step 230, a current block (of a current CTU) is de-quantized and possibly inverse transformed (step 240), to obtain a decoded prediction residual block.

On the other hand, the prediction information data is used to predict the current block. A predicted block is obtained through its intra prediction (step 250) or its motion-compensated temporal prediction (step 260). The prediction process performed at the decoding side is identical to that of the encoding side.

Next, the decoded prediction residual block and the predicted block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 5).

Intra template matching prediction (ITMP) mode is a special intra prediction mode of a target block (current block of a video picture to be predicted) that copies the best block (becoming an intra-prediction block) from a reconstructed block of the video picture, whose L-shaped template matches the L-shaped template of the target block. Basically, for a predefined search area (search zone), the encoder searches for the most similar L-shaped template of a reconstructed block of the video picture to the L-shaped template of the target block and uses the corresponding block as the best intra-prediction block. The encoder then signals the usage of ITMP mode as prediction information, and the same prediction operation is performed at the decoder side.

In ECM (Algorithm description of Enhanced Compression Model 5 (ECM 5), M. Coban et al, JVET-Z2025, April 2022), ITMP mode is enabled for blocks with size less than or equal to a maximum size of 64 in width and height. This maximum size is configurable.

FIG. 7 illustrates a block diagram of a method 300 of intra template matching predicting (ITMP) a target block of a video picture in accordance with prior art.

Figure 20:
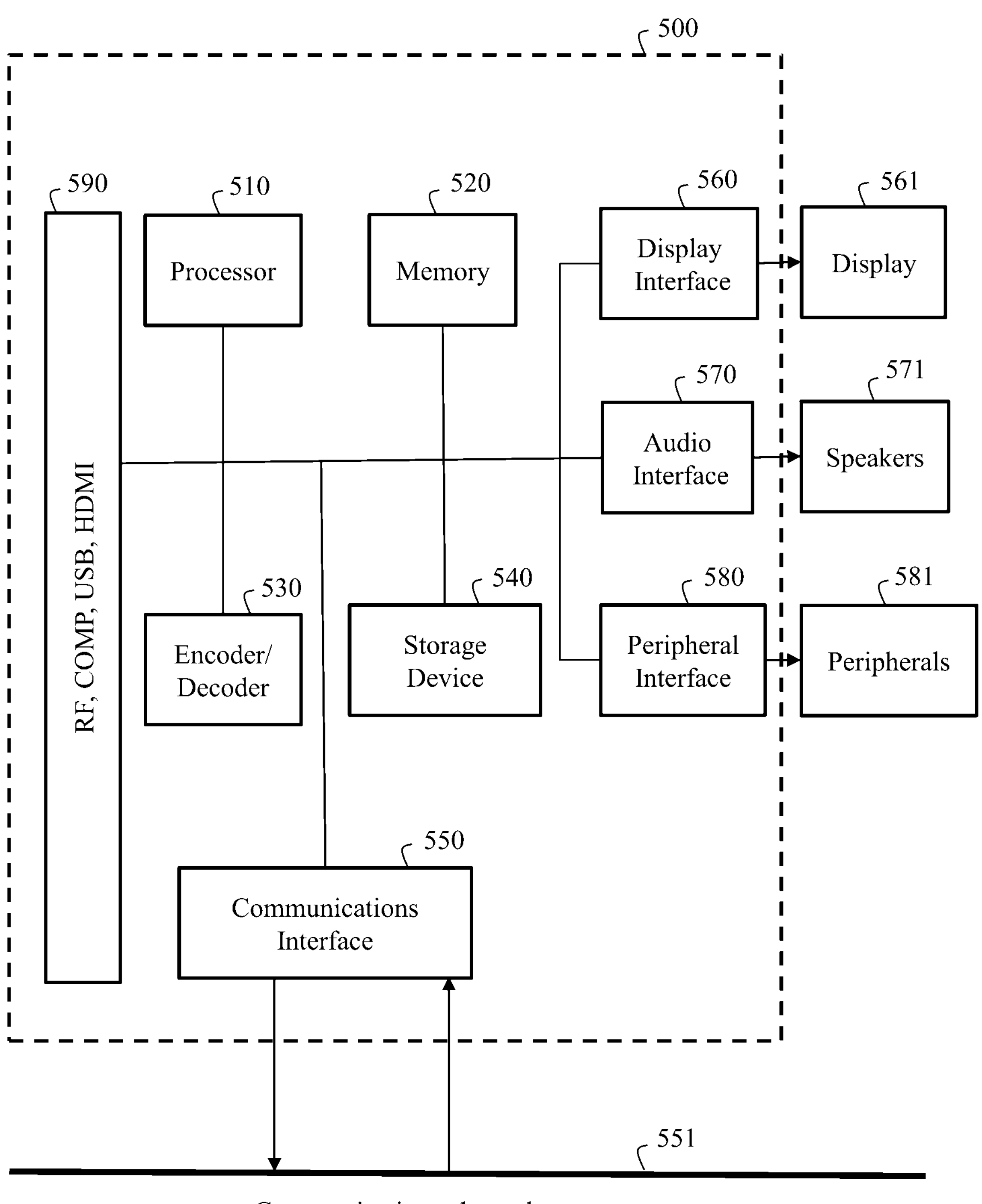
FIG. 20 illustrates a schematic block diagram of an example of a system in which various aspects and embodiments are implemented.

Method 300 is implemented the same way both by method 100 (encoding) and method 200 (decoding) saving thus data signalling against controlled extra complexity. Only the use of ITMP may be signalled by a single flag at the CU level carried on by a dedicated syntax element intra_tmp_flag (FIG. 20). Both at the encoding and decoding sides, ITMP mode may be tested as an intra predictor candidate for predicting the target block.

In step 310, a target block neighbourhood is analysed to determine room for a search area R. Search area R comprises usually multiple available CTUs and search area boundaries are determined for each available CTU.

Possibly, search area R may slightly overtake CTU frontiers if such a CTU is available. For implementation rationales, there may be slight overlaps between two different search areas.

Figure 8:
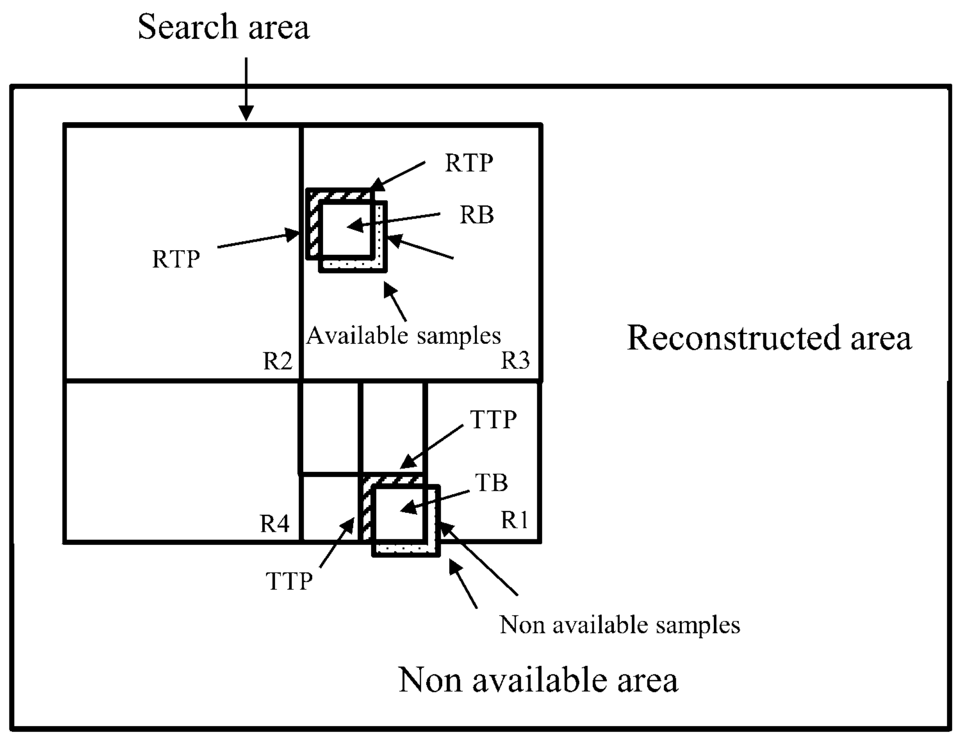
FIG. 8 shows a search area used in ITMP in accordance with prior art.

FIG. 8 shows a search area defined for predicting a target block TB of a video picture in accordance with prior art.

Usually, the search area comprises four spatial areas R1, R2, R3 and R4. Area R1 is the current CTU that comprises the target block TB (block to be predicted of the video picture), area R2 is the top left CTU, R3 is the above CTU and R4 is the left CTU.

The width SearchRange_w and the height SearchRange_h of the areas R1-R3 are set proportional to the target block width BlkW and the target block height BlkH to have a fixed number of comparisons per pixel. That is:

$$\text{SearchRange\_w} = a * BlkW \tag{2}$$

-continued $$\text{SearchRange\_h} = a * BlkH$$

where 'a' is a constant integer value that controls the gain/complexity trade-off. The factor 'a' may depend on the targeted block width and height, target template width (e.g., fixed at 4 samples) and/or the CTU size. In practice, 'a' is equal to 5.

In step 320, a target block neighborhood TBN is defined according to availability of reconstructed samples in the current CTU that comprises the target block TB and in surrounding CTUs. The target block neighborhood TBN defines positions of available reconstructed samples used for building a target template patch TTP as discussed later.

For example, as illustrated in FIG. 8, in case a vertical or horizontal flipping occurs on the target block TB, adjacent samples located below or on the right of the target block, respectively, are not available (not yet reconstructed) and cannot be used to generate a target block neighborhood TBN used in the template matching candidate search of FIG. 9.

The target block neighborhood TBN is a "L-shaped template" type (as illustrated in FIG. 8) if reconstructed samples in the target block L-shaped neighborhood are available, a "left template" type if only reconstructed samples in the left part of the target block TB are available (i.e. above CTU samples are not available typically when TB comes up to the top video picture border or search zone R), a "above template" type if only reconstructed samples in the above part of the target block TB are available (i.e. left CTU samples are not available typically when the target block TB comes up to the left video picture border or search zone R) or "no template" if no reconstructed samples surrounding the target block is available (typically when the target block TB comes up to the top-left video picture corner or search zone R).

If the target block neighborhood TBN is "no template", then in step 330 the intra-prediction block used for prediction the target block TB is set as a DC (Direct Coding) value, e.g. 1<<(1−bitdepthy) where bitdepthy represents the bit depth of luma samples of the video picture.

Otherwise, in step 340, a candidate reference block RB in the search area R is selected according to a template matching candidate search. The intra-prediction block of the target block is said candidate reference block RB.

Figure 9:
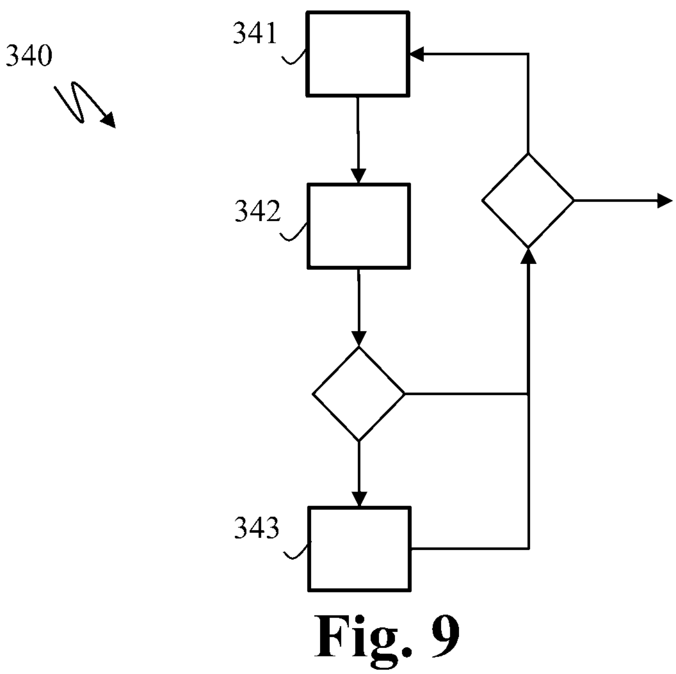
FIG. 9 illustrates schematically a block diagram of a template matching candidate search (step 340) in accordance with prior art.

FIG. 9 illustrates schematically a block diagram of a template matching candidate search (step 340) in accordance with prior art.

A target template patch TTP is associated with the target block TB. The target template patch TTP is built from available reconstructed samples in the target block neighborhood TBN. Availability of reconstructed samples in the target block neighborhood TBN depends on position of the target block TB compared to the video picture or search area boundaries.

For each current position in the search area R, in step 341, a candidate reference block RB located at the current position is considered and a candidate reference template patch RTP is associated with said candidate reference block RB. The candidate reference template RTP is built from reconstructed samples in a candidate reference block neighborhood RBN.

A candidate reference block neighborhood RBN is associated with a candidate reference block RB. A candidate reference block neighborhood RBN defines positions of reconstructed samples in the search area R in a neighborhood of said candidate reference block RB. The candidate reference block neighborhood RBN is defined according to a target block neighborhood TBN, i.e. the positions defined by the candidate reference block neighborhood RBN are defined according to the positions of the target block neighborhood TBN. The shape and layout of candidate reference block neighborhood RBN and target block neighborhood TBN are the same.

In step 342, a cost is associated with the candidate reference block RB to evaluate the matching between the reconstructed samples of the target template patch TTP and the reconstructed samples of the candidate reference template patch RTP.

If the current cost is not improved over a best cost then another position in the search area is considered (step 341).

If the current cost improves the best cost, in step 343, the best cost is set equal to the current cost and the candidate reference block RB is set as the best candidate reference block.

Step 343 is followed by step 341 until all positions of the search area have been considered.

For example, the cost is the result of a Sum of Absolute Difference (SAD) between reconstructed samples of a candidate reference patch RTP and reconstructed samples of the target template patch TTP.

Template matching is a large field in image and video processing. However it was historically dismissed from video standardization activities because of its inherent complexity. Template matching has been applied to Intra prediction mode coding with its introduction in ECM with the contribution JVET-U0048 (Evaluation of Template Matching Prediction for VVC, K. Naser et al, JVET-U0048, January 2021 and EE2: Intra Template Matching, K. Naser et al, JVET-V0130, April 2021). Indeed, ECM is less demanding in terms of affordability of complexity as compression performance prevail in this exploratory stage before a hypothetical standardization stage per se.

The target block neighborhood TBN (or a candidate reference block neighborhood RBN) defined in the prior art limits matching possibilities. It consists of a horizontal (when above reconstructed samples are available) and/or vertical (when left reconstructed samples are available) band of 4 samples aside a target block which are matched against candidate reference template patch (band of 4 samples aside a candidate reference block) defined in a search area.

The problem solved by the present disclosure is to improve compression efficiency and the usage of ITMP mode.

At least one embodiment of the present disclosure has been devised with the foregoing in mind.

At least one of the aspects generally relates to video picture encoding and decoding, one other aspect generally relates to transmitting a bitstream provided or encoded and one other aspects relates to receiving/accessing a decoded bitstream.

At least one of the embodiments is described for encoding/decoding a video picture but extends to the encoding/decoding of video pictures (sequences of pictures) because each video picture is sequentially encoded/decoded as described below.

Moreover, the at least one embodiments are not limited to the current version of VVC. The at least one embodiment may apply to pre-existing or future-developed, and extensions of VVC and recommendations. Unless indicated otherwise, or technically precluded, the aspects described in the present disclosure may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component (also called picture component, or channel) determined by a specific picture/video format which specifies all information relative to pixel values and all information which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y,Cb,Cr) format or may comprise three color components (one for Red, one for Green and one for Blue) when the picture/video format is the well-known (R,G,B) format.

Each component of a video picture may comprise a number of samples relative to a number of pixels of a screen on which the video picture is intended to be display. In variants, the number of samples comprised in a component may be a multiple (or fraction) of a number of samples comprised in another component of a same video picture.

For example, in the case of a video format comprising a luma component and two chroma component like the (Y,Cb, Cr) format, dependent on the color format considered, the chroma component may contain half the number of samples in width and/or height, relative to the luma component.

A sample is the smallest visual information unit of a component composing a video picture. A sample value may be, for example a luma or chroma value or a colour value of a (R, G, B) format.

A reconstructed sample is a sample which has been encoded according to method 100 and decoded according to method 200.

A pixel value is the value of a pixel of a screen. A pixel value may be represented by one sample for monochrome video picture and by multiple co-located samples for color video picture. Co-located samples associated with a pixel mean samples corresponding to the location of a pixel in the screen.

It is common to consider a video picture as being a set of pixel values, each pixel being represented by at least one sample.

A block of a video picture is a set of samples of one component of the video picture. A block of at least one luma sample or a block of at least one chroma sample may be considered when the picture/video format is the well-known (Y,Cb,Cr) format, or a block of at least one color sample when the picture/video format is the well-known (R, G, B) format.

The at least one embodiment is not limited to a particular picture/video format.

Generally speaking, the present disclosure relates to a method of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area. The method comprises determining the candidate reference block neighborhood according to the target block neighborhood reconstructed samples availability and according to a geometry transform type; obtaining the reconstructed samples of the candidate reference template patch by applying a geometry transform, identified by the geometry transform type, on the reconstructed samples in the candidate reference block neighborhood; and associating a cost with the candidate reference block obtained by comparing the reconstructed samples of the candidate reference template patch and the reconstructed samples of the target template patch; selecting the candidate reference block with a minimum cost, said selected candidate reference block being associated with a geometry transform type identifying a geometry transform; and generating an intra-prediction block for the target block by applying the geometry transform, identified by the geometry transform type associated with the selected candidate reference block, to reconstructed samples of the selected candidate reference block.

FIG. 10 illustrates schematically a block diagram of a method 400 of intra-predicting a target block TB of a video picture based on template matching in accordance with an embodiment of the present disclosure.

Method 400 is based on template matching candidate search that compares a target template patch TTP associated with the target block TB with a candidate reference template patch RTP associated with a candidate reference block RB located in a position of a search area R.

In step 410, a candidate reference block neighborhood RBN is determined according to the target block neighborhood reconstructed samples availability and a geometry transform type GTT (refers to FIGS. 14 and 15 for examples).

A geometry transform type GTT identifies a geometry transform GT.

In step 430, a candidate reference template patch RTP associated with a candidate reference block RB located at a position of the search area is obtained. The candidate reference template patch RTP comprises reconstructed samples. Said reconstructed samples are obtained by applying a geometry transform, identified by the geometry transform type GTT, on the reconstructed samples in the candidate reference block neighborhood RBN.

For instance, if the target block neighborhood TBN indicates that above and left neighboring reconstructed samples of target block TB are available, the target template patch TTP comprises above and left neighboring reconstructed samples of the target block TB. If the geometry transform is a horizontal flipping, the transformed reconstructed sample positions correspond to above and right reconstructed samples in the candidate reference block neighborhood RTP.

In another example, if the target block neighborhood TBN indicates that above and left neighboring reconstructed samples of target block TB are available, the target template patch TTP comprises above and left neighboring reconstructed samples of the target block TB. If the geometry transform is a vertical flipping, the transformed reconstructed sample positions correspond to bottom and left reconstructed samples in the candidate reference block neighborhood RTP.

The reconstructed samples of the target block and the reconstructed samples of a candidate reference template patch RTP do not directly correspond (i.e. are not co-located with regards to the reference and target block neighborhoods) because the geometry transform has been applied on reconstructed sample positions.

Figure 13:
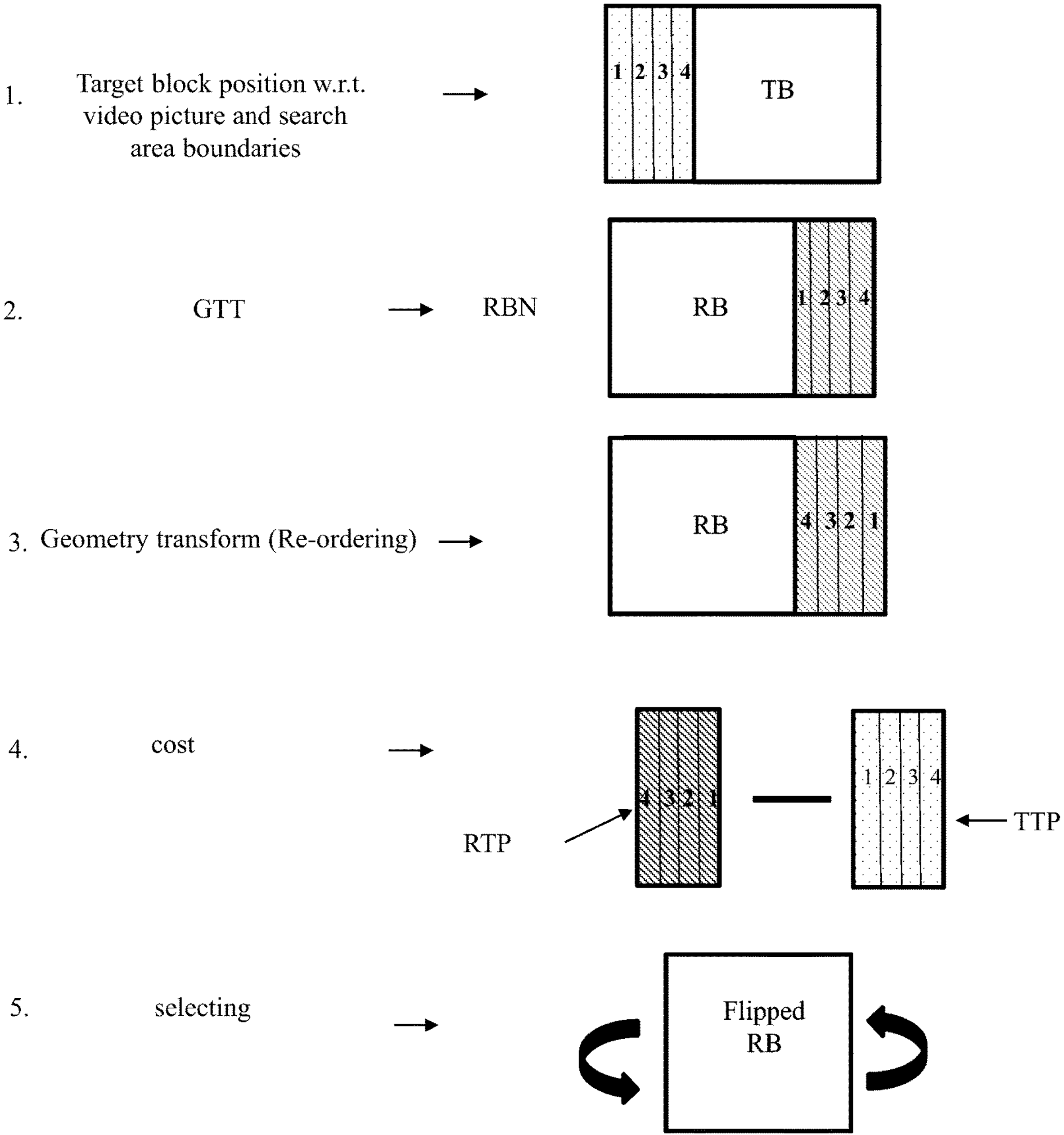
FIG. 13 illustrates the method 400 of FIG. 10 when the geometry transform is a horizontal flipping in accordance with an embodiment of the present disclosure.

Example of re-ordered transformed samples is given in step 3 of FIG. 13 when the geometry transform GT is a horizontal flipping.

In step 440, a cost is associated with the candidate reference block RB by comparing reconstructed samples of the candidate reference template patch RTP and the reconstructed samples of the target template patch TTP.

In one embodiment, the cost is evaluated by a Sum of Absolute Difference (SAD) between reconstructed samples of the reference template patch RTP and reconstructed samples of the target template patch TTP.

In step 450, a candidate reference block is selected. It corresponds to a candidate reference template patch RTP that provides the lowest cost. The selected candidate reference block RB is associated with a geometry transform type GTT that identifies the geometry transform GT applied on reconstructed sample positions.

In step 460, an intra-prediction block for the target block TB is generated by applying the geometry transform GT, identified by the geometry transform type GTT associated with the selected candidate reference block RB, to reconstructed samples of the selected candidate reference block RB.

In one embodiment, method 400 further comprises step 420 in the course of which a search area is adjusted according to a geometry transform type GTT and a location of the target block TB in the video picture.

Search area boundaries are adjusted compared to method 300 (ITMP method as defined in prior art). Thus, search area must contain candidate reference and target template patch reconstructed samples. Indeed, in case of vertical and/or horizontal flipping, the candidate reference template patch reconstructed samples on the bottom and/or right sides of the candidate reference block RB shall be available.

Thus, in case of vertical flipping, the search area has to consider a template band (e.g. 4) added to the reference block height when close to the bottom video picture boundary or close to the target block.

In case of horizontal flipping the search area has to consider the band size added to the right of the reference block width when close to the right video picture boundary or close to the target block.

The candidate reference template areas, corresponding to flipping, which are located on the right and/or bottom of the candidate reference block RB shall be included in the search area.

Inversely, as left and/or above reconstructed samples are not used for the candidate reference block RB when flipping is horizontal and/or vertical, respectively, reference block positions in the search area can go up to the left and/or top video picture or search area boundaries.

Thus, the search area boundaries are determined according to the target block neighborhood TBN and the geometry transform type (especially when flipping) so that candidate reference template reconstructed samples are available for comparison with the target template patch reconstructed samples.

FIGS. 11 and 12 illustrate examples of search area adjustments (and consequences on possible candidate reference block RB positions) at video picture or search area boundaries in accordance with an embodiment of the present disclosure.

For example, when the target block TB is located on the bottom boundary of the video picture (top of FIG. 11) and the geometry transform type GTT is vertical and horizontal flipping, the search area boundaries are adjusted so that candidate reference block neighborhood RBN comprises the bottom border of the video picture and so that candidate reference block RB left side samples coincide with the left border of the video picture. When the target block TB is located on the left boundary of the video picture (bottom of FIG. 11) and the geometry transform type GTT is vertical flipping, the search area boundaries are adjusted so that candidate reference block neighborhood RBN comprises the target block neighborhood TBN rows. When the target block TB is located on the top boundary of the video picture (top of FIG. 12) and the geometry type transform (GTT) is horizontal flipping, the search area boundaries are adjusted so that the candidate reference block RB can go up to the top-left border of the video picture. When the target block is located on the right boundary of the video picture (bottom of FIG. 12) and the geometry transform type (GTT) is horizontal and vertical flipping, the search area boundaries are adjusted so that the candidate reference block neighborhood RBN comprises at least one samples (e.g. 4 samples) located along the right boundary of the video picture.

In one embodiment, geometry transform type indicates at least one of the following geometry transforms or a combination of at least two of the following geometry transforms:

a horizontal flipping;

a vertical flipping;

a rotation;

identity.

In one embodiment, a rotation angle of the rotation is a multiple of 90°.

In some implementations (with high-end processing capabilities), combining rotations and flipping transforms is advantageous because it begets geometry transforms that cannot be generated from pure combination of flipping or rotations, increasing the number of candidates i.e. improving signal adaptation.

In other implementations (with limited memory e.g. in embedded systems), combining only flipping or only rotations can avoid implementing either rotations or flipping routines, respectively (e.g. 180° rotation can be implemented as the combination of a horizontal flipping followed by a vertical flipping) reducing thus the implementation footprint of the geometry transform applied to the reconstructed samples.

In one embodiment of method 400, in step 470, the geometry transform type GTT associated with the selected candidate reference block RB is signaled in a bitstream B.

This embodiment increases the bandwidth for transmitting the bitstream B but limits the complexity of the decoder.

In one embodiment, the geometry transform type GTT associated with the selected candidate reference block RB is not signaled in the bitstream B and method 400 considers every geometry transform of a set of geometry transforms of a set of candidate reference blocks RB located at positions in the search area, both at the encoder and the decoder.

In one embodiment, the geometry transform type GTT is inherited from reconstructed blocks. As an example, if one of the neighboring block of the target block TB is coded with ITMP mode, a geometry transform type GTT2 associated to this neighboring block is used as a predictor of the geometry transform type GTT.

Advantageously, if the geometry transform type GTT2 is not the optimal geometry transform type (determined on the encoder side), then the geometry transform GTT is explicitly signaled in the bitstream.

In one variant, if there are more than one neighboring blocks of the target block TB coded with ITMP mode and their respective geometry transform type are different, the most occurrent geometry transform type is selected as the geometry transform type GTT predictor.

In another variant, an index signals the position of the neighboring block coded with ITMP mode and the associated geometry transform type is selected.

These last embodiments limit the bandwidth required for transmitting the bitstream B but increases the complexity at the decoder.

FIG. 13 illustrates the method 400 when the geometry transform is a horizontal flipping in accordance with an embodiment of the present disclosure.

In step 1, a target block neighbourhood is analysed to determine room for a search area R, and available reconstructed samples in the target block neighborhood TBN are identified.

In the example, only the reconstructed samples located on the left neighborhood of the target block TB are available. The candidate reference block neighborhood RBN is of type "left template" (band of 4 samples aside the target block TB).

In step 2, the candidate reference block neighborhood RBN is determined according to the target block neighborhood TBN reconstructed samples availability and a geometry transform type GTT (see FIG. 14) so that the candidate reference block neighborhood RBN is located on the right of candidate reference block RB in this example considering horizontal flipping GTT.

In step 3, a geometry transform GT associated to the geometry transform type GTT, here a horizontal flipping, is applied on the reconstructed samples of the candidate reference block neighborhood RBN. This consists, here, in a horizontal reordering of these sample positions. The candidate reference template patch RTP comprises reconstructed samples located at the re-ordered reconstructed sample positions. The output of step 3 begets samples constituting the reference template patch RTP.

When a horizontal flipping is applied on samples of the candidate reference block RB, as illustrated on FIG. 13, the transformed reconstructed samples are re-ordered according to the distance to the candidate reference block centre. As illustrated on FIG. 13, 4 reconstructed sample positions with indices 1, 2, 3 and 4 are horizontal flipped and correspond respectively to transformed reconstructed sample positions indices 4, 3, 2 and 1. When the geometry transform is a rotation according to a direction (clockwise or anti-clockwise), the samples positions in the candidate reference block neighborhood RBN of the candidate reference block RB samples are re-ordered according to the direction of the rotation.

In step 4, for a given target block TB, a cost is associated with each candidate reference block RB by comparing reconstructed samples of the candidate reference template patch RTP and the reconstructed samples of the target template patch TTP.

In step 5, the candidate reference block RB associated with a geometry transform type GTT is selected. The selected candidate reference block corresponds to the candidate reference block RB associated with the minimum cost. The geometry transform identified by the geometry transform type GTT associated with the selected candidate reference block RB, is applied on the reconstructed samples of the selected candidate reference block RB. Here the selected candidate reference block RB is horizontally flipped, and the intra-prediction block for the target block TB is the horizontally flipped selected candidate reference block RB.

The usual template matching candidate search of FIG. 9 does not check matching between the target template patch and a candidate reference template patch whose positions of their reconstructed samples are geometrically transformed. For example, if the target block neighborhood TBN indicates a "above template", only the available reconstructed samples located above the target block TB (i.e. target template patch TTP) are compared with the reconstructed samples located above a candidate reference block RB (i.e. reference template patch RTP). Instead, according to method 400, the reconstructed samples located above the candidate reference block RB (the reference template patch RTP) are geometrically transformed (i.e. reordered) in order to check if a transformed version of those reconstructed samples matches with the reconstructed samples of the target template patch.

FIG. 14 illustrates some examples of neighborhood template determination according to flipping (geometry transform type) in accordance with an embodiment of the present disclosure.

When the above and left neighboring samples of a target block TB are available and the geometry transform GT is an identity function, a horizontal, vertical or horizontal and vertical flipping, then the candidate reference block neighborhood RBN indicates a "L-shaped template" which layout for the candidate reference block RB depends on the flipping mode.

When only the above neighboring samples of target block TB are available and the geometry transform is an identity function or a horizontal flipping, then the candidate reference block neighborhood RBN indicates a "above template" which layout for the candidate reference block RB depends on the flipping mode.

When only the above neighboring samples of target block TB are available and the geometry transform is a vertical or horizontal and vertical flipping, then the candidate reference block neighborhood RBN indicates a "bottom template" which layout for the candidate reference block RB depends on the flipping mode.

When only the left neighboring samples of target block TB are available and the geometry transform is the identity function or a vertical flipping, then the candidate reference block neighborhood RBN indicates a "left template" which layout for the candidate reference block RB depends on the flipping mode.

When only the left neighboring samples of target block TB are available and the geometry transform is a horizontal or horizontal and vertical flipping, then the candidate reference block neighborhood RBN indicates a "right template" which layout for the candidate reference block RB depends on the flipping mode.

FIG. 15 illustrates some examples of neighborhood template determination according to rotations (geometry transform type) in accordance with an embodiment of the present disclosure.

When the above and left neighboring samples of a target block TB are available, the candidate reference block neighborhood RBN indicates a "L-shaped template". The "L-shaped template" layout also depends on the degree of the rotation.

When only the above neighboring samples of target block TB are available, the candidate reference block neighborhood RBN is either the "above template' if the rotation degree equal to 0, the "right template' if the rotation degree equal to 90, the "bottom template' if the rotation degree equal to 180, and the "left template' if the rotation degree equal to 270.

When only the left neighboring samples of target block TB are available, the candidate reference block neighborhood RBN is either the "left template' if the rotation degree equal to 0, the "above template' if the rotation degree equal to 90, the "right template' if the rotation degree equal to 180, and the "bottom template' if the rotation degree equal to 270.

Figure 16:
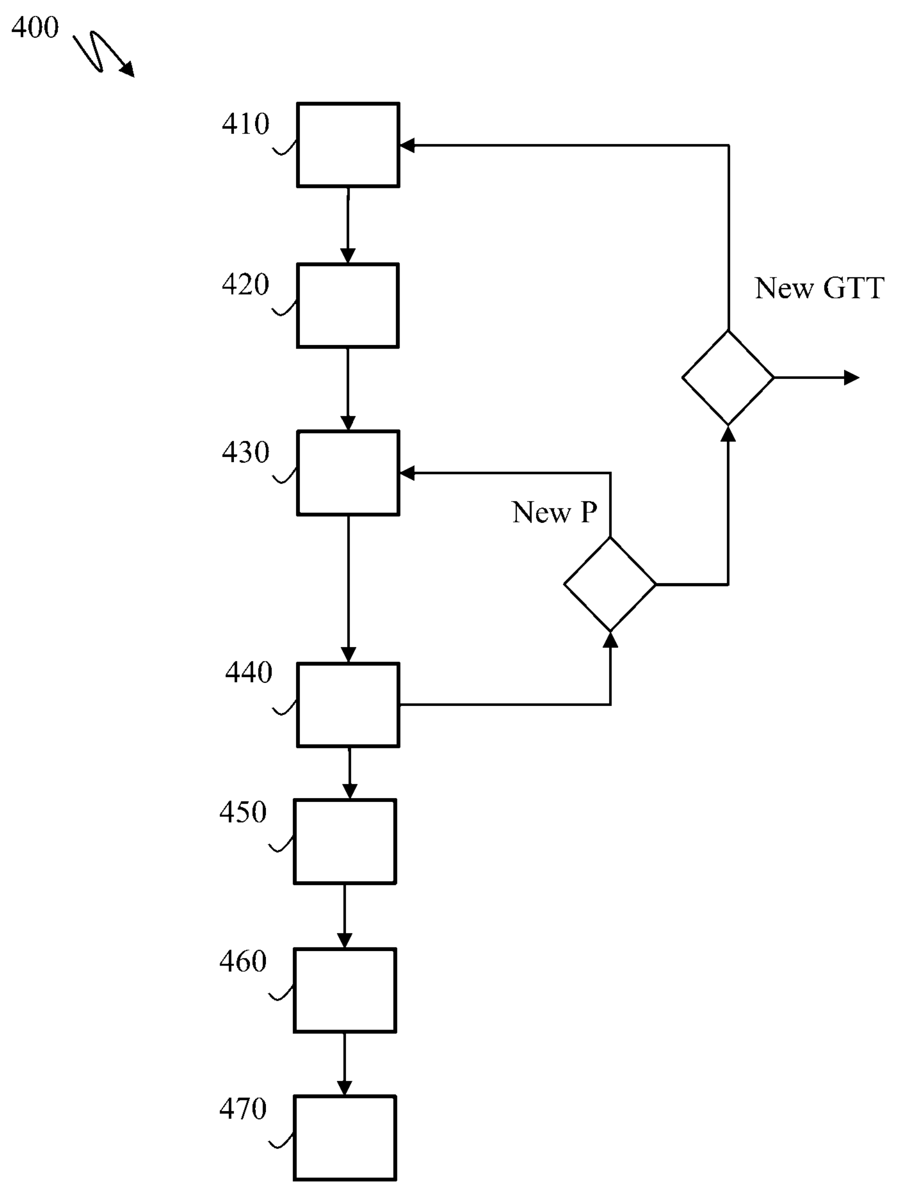
FIG. 16 illustrates schematically a block diagram of method 400 in accordance with an embodiment.

FIG. 16 illustrates schematically a block diagram of method 400 in accordance with an embodiment.

This embodiment is only adapted to method 100 (encoding).

For each geometry transform type GTT indicating either a geometry transform of a set of geometry transforms or a combination of at least two of said geometry transforms, steps 410 runs. In an implementation, step 420 also runs. For each position P in the determined search area, steps 430 and 440 run. When all the positions in the determined search area have been considered, another geometry transform type (new GTT) is considered.

When all the geometry transform type have been considered, the selected candidate reference block is the candidate reference block with a minimum cost (450).

FIG. 17 illustrates schematically a block diagram of method 400 in accordance with an embodiment.

This embodiment is only adapted to method 100 (encoding).

For each new position (new P) in the initial search area, each new considered geometry transform type (new GTT) indicating either a geometry transform of a set of geometry transforms or a combination of at least two of said geometry transforms is considered.

For each new considered geometry transform type (new GTT), steps 410, 430 and 440 run, and In an implementation, an initial search area is adjusted according to step 420 (between steps 410 and 430).

When all the new considered geometry transform type (new GTT) have been considered, another position in the initial search area is considered.

When all the positions in the initial search area have been considered, the selected candidate reference block is the candidate reference block with a minimum cost (450).

Figure 18:
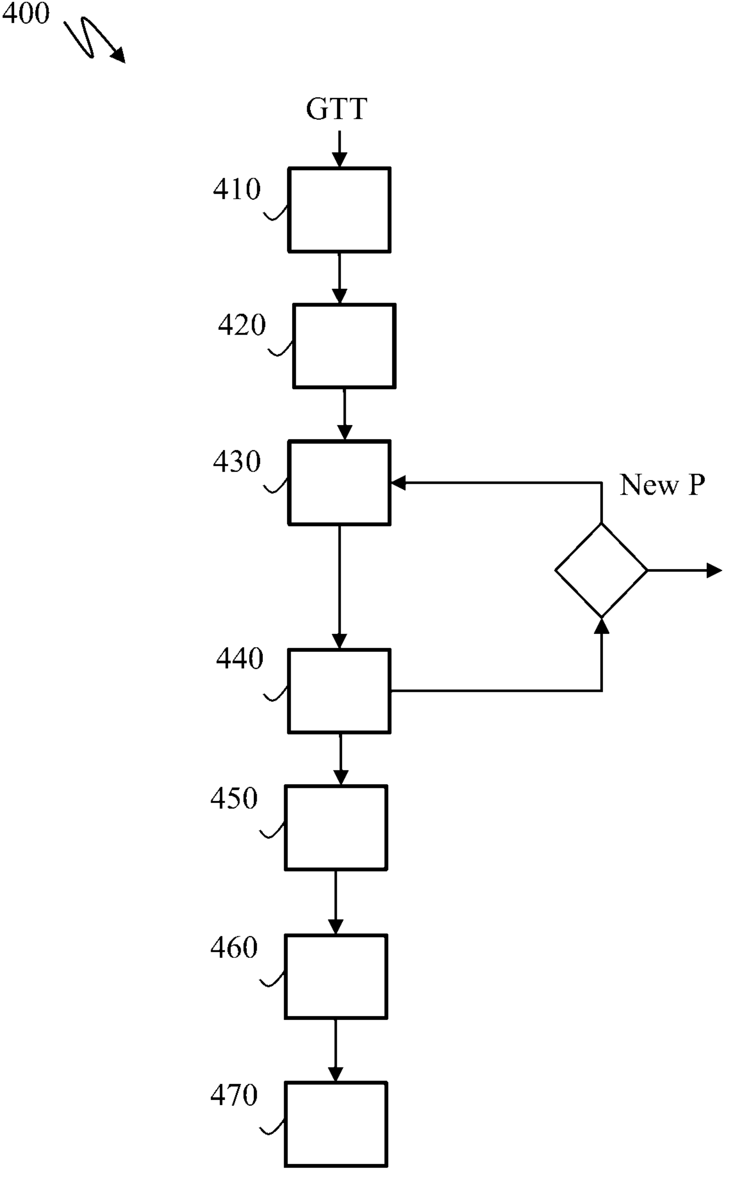
FIG. 18 illustrates schematically a block diagram of method 400 in accordance with an embodiment.

FIG. 18 illustrates schematically a block diagram of method 400 in accordance with an embodiment.

This embodiment is only adapted to method 200 (decoding).

A geometry transform type GTT indicating either a geometry transform of a set of geometry transforms or a combination of at least two of said geometry transforms is obtained, from example by parsing a bitstream.

In an implementation, step 420 also runs.

For each position P in the determined search area, steps 430 and 440 run. When all the positions in the determined search area have been considered, the selected candidate reference block is the candidate reference block with a minimum cost (450).

In one embodiment of step 470, illustrated on FIG. 19, a geometry transform type is signalled in the bitstream B as an integer value intra_tmp_flip_type of a coding unit syntax element as defined in VVC when the geometry transform type indicates a flipping mode, i.e. a horizontal or vertical or a horizontal and vertical flipping.

For example, when intra_tmp_flip_type is equal to 0, geometry transform type is disabled (i.e. identity). When intra_tmp_flip_type is equal to 1, geometry transform type is a horizontal flipping used for intra-predicting a target block of the video picture according to the method 400. When intra_tmp_flip_type is equal to 2, geometry transform type is a vertical flipping mode used for intra-predicting a block of the video picture according to the method 400. When intra_tmp_flip_type is equal to 3, geometry transform type is a combination of a vertical and horizontal flipping used for intra-predicting a target block of the video picture according to the method 400.

As another example, an intra_tmp_flip_flag is equal to 1 in order to set intra_tmp_flip_type. If intra_tmp_flip_flag is equal to 0, intra_tmp_flip_type is not signaled and its value is inferred to 0.

The present disclosure is not limited to a particular structure of a syntax element for carrying on a geometry transform type in a bitstream. Moreover, the example of FIG. 19 does not limit the meaning of a geometry transform type than may extend to indicate other geometry transform such a rotation or a combination of rotation, or combination of at least one flipping and at least one rotation.

FIG. 20 shows a schematic block diagram illustrating an example of a system 500 in which various aspects and embodiments are implemented.

System 500 may be embedded as one or more devices including the various components described below. In various embodiments, system 500 may be configured to implement one or more of the aspects described in the present disclosure.

Examples of equipment that may form all or part of the system 500 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 500, singly or in combination, may be embodied in a single integrated circuit (IC), multiple ICs, and/or discrete components. For example, in at least one embodiment, the processing and encoder/decoder elements of system 500 may be distributed across multiple ICs and/or discrete components. In various embodiments, system 500 may be communicatively coupled to other similar systems, or to other electronic devices, via, for example, a communications bus or through dedicated input and/or output ports.

System 500 may include at least one processor 510 configured to execute instructions loaded therein for implementing, for example, the various aspects described in the present disclosure. Processor 510 may include embedded memory, input output interface, and various other circuitries as known in the art. System 500 may include at least one memory 520 (for example a volatile memory device and/or a non-volatile memory device). System 500 may include a storage device 540, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 540 may include an internal storage device, an attached storage device, and/or a network accessible storage device, as non-limiting examples.

System 500 may include an encoder/decoder module 530 configured, for example, to process data to provide encoded/decoded video picture data, and the encoder/decoder module 530 may include its own processor and memory. The encoder/decoder module 530 may represent module(s) that may be included in a device to perform the encoding and/or decoding functions. As is known, a device may include one or both encoding and decoding modules. Additionally, encoder/decoder module 530 may be implemented as a separate element of system 500 or may be incorporated within processor 510 as a combination of hardware and software as known to those skilled in the art.

Program code to be loaded onto processor 510 or encoder/decoder 530 to perform the various aspects described in the present disclosure may be stored in storage device 540 and subsequently loaded onto memory 520 for execution by processor 510. In accordance with various embodiments, one or more of processor 510, memory 520, storage device 540, and encoder/decoder module 530 may store one or more of various items during the performance of the processes described in the present disclosure. Such stored items may include, but are not limited to video picture data, information data used for encoding/decoding video picture data, a bitstream, matrices, variables, and intermediate or final results from the processing of equations, formulas, operations, and operational logic.

In several embodiments, memory inside of the processor 510 and/or the encoder/decoder module 530 may be used to store instructions and to provide working memory for processing that may be performed during encoding or decoding.

In other embodiments, however, a memory external to the processing device (for example, the processing device may be either the processor 510 or the encoder/decoder module 530) may be used for one or more of these functions. The external memory may be the memory 520 and/or the storage device 540, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 500 may be provided through various input devices as indicated in block 590. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various embodiments, the input devices of block 590 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 500 to other electronic devices across USB and/or HDMI connections. It is to be understood that various aspects of input processing, for example, Reed-Solomon error correction, may be implemented, for example, within a separate input processing IC or within processor 510 as necessary. Similarly, aspects of USB or HDMI interface processing may be implemented within separate interface ICs or within processor 510 as necessary. The demodulated, error corrected, and demultiplexed stream may be provided to various processing elements, including, for example, processor 510, and encoder/decoder 530 operating in combination with the memory and storage elements to process the data stream as necessary for presentation on an output device.

Various elements of system 500 may be provided within an integrated housing. Within the integrated housing, the various elements may be interconnected and transmit data therebetween using suitable connection arrangement 590, for example, an internal bus as known in the art, including the I2C bus, wiring, and printed circuit boards.

The system 500 may include communication interface 550 that enables communication with other devices via communication channel 551. The communication interface 550 may include, but is not limited to, a transceiver configured to transmit and to receive data over communication channel 551. The communication interface 550 may include, but is not limited to, a modem or network card and the communication channel 551 may be implemented, for example, within a wired and/or a wireless medium.

Data may be streamed to system 500, in various embodiments, using a Wi-Fi network such as IEEE 802.11. The Wi-Fi signal of these embodiments may be received over the communications channel 551 and the communications interface 550 which are adapted for Wi-Fi communications. The communications channel 551 of these embodiments may be typically connected to an access point or router that provides access to outside networks including the Internet for allowing streaming applications and other over-the-top communications.

Other embodiments may provide streamed data to the system 500 using a set-top box that delivers the data over the HDMI connection of the input block 590.

Still other embodiments may provide streamed data to the system 500 using the RF connection of the input block 590.

The streamed data may be used as a way for signaling information used by the system 500. The signaling information may comprise the bitstream B and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various embodiments.

System 500 may provide an output signal to various output devices, including a display 561, speakers 571, and other peripheral devices 581. The other peripheral devices 581 may include, in various examples of embodiments, one or more of a stand-alone DVR, a disk player, a stereo system, a lighting system, and other devices that provide a function based on the output of system 500.

In various embodiments, control signals may be communicated between the system 500 and the display 561, speakers 571, or other peripheral devices 581 using signaling such as AV.Link (Audio/Video Link), CEC (Consumer Electronics Control), or other communications protocols that enable device-to-device control with or without user intervention.

The output devices may be communicatively coupled to system 500 via dedicated connections through respective interfaces 560, 570, and 580.

Alternatively, the output devices may be connected to system 500 using the communications channel 551 via the communications interface 550. The display 561 and speakers 571 may be integrated in a single unit with the other components of system 500 in an electronic device such as, for example, a television.

In various embodiments, the display interface 560 may include a display driver, such as, for example, a timing controller (T Con) chip.

The display 561 and speaker 571 may alternatively be separate from one or more of the other components, for example, if the RF portion of input 590 is part of a separate set-top box. In various embodiments in which the display 561 and speakers 571 may be external components, the output signal may be provided via dedicated output connections, including, for example, HDMI ports, USB ports, or COMP outputs.

In FIGS. 1-20, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 510 or by hardware, or by a combination of hardware and software. As a non-limiting example, the embodiments may be also implemented by one or more integrated circuits. The memory 520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 510 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations.—For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms “a”, “an”, and “the” may be intended to include the plural forms as well, unless the context clearly indicates otherwise. It will be further understood that the terms “includes/comprises” and/or “including/comprising” when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being “responsive” or “connected” or “associated with” to another element, it may be directly responsive or connected to or associated with the other element, or intervening elements may be present. In contrast, when an element is referred to as being “directly responsive” or “directly connected” to or “directly associated with” other element, there are no intervening elements present.

It is to be appreciated that the use of any of the symbol/term “/”, “and/or”, and “at least one of”, for example, in the cases of “A/B”, “A and/or B” and “at least one of A and B”, may be intended to encompass the selection of the first listed option (A) only, or the selection of the second listed option (B) only, or the selection of both options (A and B). As a further example, in the cases of “A, B, and/or C” and “at least one of A, B, and C”, such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present disclosure. No ordering is implied between a first element and a second element.

Reference to “one embodiment” or “an embodiment” or “one implementation” or “an implementation”, as well as other variations thereof, is frequently used to convey that a particular feature, structure, characteristic, and so forth (described in connection with the embodiment/implementation) is included in at least one embodiment/implementation. Thus, the appearances of the phrase “in one embodiment” or “in an embodiment” or “in one implementation” or “in an implementation”, as well any other variations, appearing in various places throughout the present disclosure are not necessarily all referring to the same embodiment.

Similarly, reference herein to “in accordance with an embodiment/example/implementation” or “in an embodiment/example/implementation”, as well as other variations thereof, is frequently used to convey that a particular feature, structure, or characteristic (described in connection with the embodiment/example/implementation) may be included in at least one embodiment/example/implementation. Thus, the appearances of the expression “in accordance with an embodiment/example/implementation” or “in an embodiment/example/implementation” in various places in the present disclosure are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure, is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. “Decoding”, as used in this application, may encompass all or part of the processes performed, for example, on a received video picture (including possibly a received bitstream which encodes one or more video picture) in order to produce a final output suitable for display or for further processing in the reconstructed video domain. In various embodiments, such processes include one or more of the processes typically performed by a decoder. In various embodiments, such processes also, or alternatively, include processes performed by a decoder of various implementations described in the present disclosure, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present disclosure may encompass all or part of the processes performed, for example, on an input video picture in order to produce an output bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present disclosure may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain embodiments the encoder signals a particular information such as coding parameter or encoded video picture data. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area, the method comprising:

determining the candidate reference block neighborhood according to availability of the reconstructed samples, and according to a geometry transform type;

obtaining the reconstructed samples of the candidate reference template patch by applying a geometry transform, identified by the geometry transform type, on the reconstructed samples in the candidate reference block neighborhood;

associating a cost with the candidate reference block obtained by comparing the reconstructed samples of the candidate reference template patch and the reconstructed samples of the target template patch;

selecting the candidate reference block with a minimum cost, the selected candidate reference block being associated with a geometry transform type identifying a geometry transform; and generating an intra-prediction block for the target block by applying the geometry transform, identified by the geometry transform type associated with the selected candidate reference block, to reconstructed samples of the selected candidate reference block.

2. The method of claim 1, further comprising:

adjusting the search area according to the geometry transform type and a location of the target block in the video picture.

3. The method of claim 1, wherein for each current geometry transform type indicating either a geometry transform of a set of geometry transforms or a combination of at least two of the geometry transforms, a candidate reference block neighborhood is determined according to the target block neighborhood reconstructed samples availability, and the current geometry transform type;

for each current position in the search area, reconstructed samples of a candidate reference template patch of a candidate reference block located in the current position of a search area, is obtained and a cost is associated with the candidate reference block located at the current position of the search area;

in response to all the positions in the search area having been considered, another geometry transform type is considered, in response to all the geometry transform types having been considered, the selected candidate reference block is the candidate reference block with a minimum cost.

4. The method of claim 1, wherein for each current position in the search area, a current geometry transform type indicating either a geometry transform of a set of geometry transforms or a combination of at least two of the geometry transforms is considered, a candidate reference block neighborhood is determined according to the target block neighborhood reconstructed samples availability, and the current geometry transform type;

reconstructed samples of a candidate reference template patch of a candidate reference block located in the current position of a search area, are obtained;

a cost is associated with the candidate reference block located at the current position;

in response to all the geometry transform type having been considered, another current position in the search is considered;

in response to all the positions in the search area having been considered, the selected candidate reference block is the candidate reference block with a minimum cost.

5. The method of claim 1, wherein for each current geometry transform type indicating either a geometry transform of a set of geometry transforms or a combination of at least two of the geometry transforms is considered, a current position in the search area is considered, a candidate reference block neighborhood is determined according to the target block neighborhood reconstructed samples availability, and a geometry transform type;

for each current position in the search area, reconstructed samples of a candidate reference template patch of a candidate reference block located in the current position of a search area, are obtained and a cost is associated with the candidate reference block located at the current position of the search area;

in response to all the positions in the search area having been considered, the selected candidate reference block is the candidate reference block with a minimum cost.

6. The method of claim 1, wherein a cost associated with a candidate reference block is evaluated by a Sum of Absolute Difference between transformed and re-ordered samples of a reference template patch and the reconstructed samples of the target template patch.

7. The method of claim 1, wherein the geometry transform type indicates at least one of or a combination of at least two of:

a horizontal flipping;

a vertical flipping;

a rotation; or an identity.

8. The method of claim 7, wherein a rotation angle of the rotation is a multiple of 90°.

9. The method of claim 1, further comprising:

signaling the geometry transform type associated with the selected candidate reference block.

10. The method of claim 1, further comprising:

encoding a block of the video picture based on the intra-prediction block of the target block; or decoding a block of the video picture based on the intra-prediction block of the target block.

11. A non-transitory computer-readable storage medium carrying instructions that, when executed by a processor of a device, the device is caused to perform a method of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area, the method comprising:

determining the candidate reference block neighborhood according to availability of the reconstructed samples, and according to a geometry transform type;

obtaining the reconstructed samples of the candidate reference template patch by applying a geometry transform, identified by the geometry transform type, on the reconstructed samples in the candidate reference block neighborhood;

associating a cost with the candidate reference block obtained by comparing the reconstructed samples of the candidate reference template patch and the reconstructed samples of the target template patch;

selecting the candidate reference block with a minimum cost, the selected candidate reference block being associated with a geometry transform type identifying a geometry transform; and generating an intra-prediction block for the target block by applying the geometry transform, identified by the geometry transform type associated with the selected candidate reference block, to reconstructed samples of the selected candidate reference block.

12. A device of intra-predicting a target block of a video picture based on template matching that compares a target template patch comprising reconstructed samples in a target block neighborhood with a candidate reference template patch comprising reconstructed samples in a candidate reference block neighborhood of a candidate reference block located at a position of a search area, the device comprising:

a processor; and a memory for storing instructions executable by the processor;

wherein the processor is configured to;

determine the candidate reference block neighborhood according to availability of the reconstructed samples, and according to a geometry transform type;

obtain the reconstructed samples of the candidate reference template patch by applying a geometry transform, identified by the geometry transform type, on the reconstructed samples in the candidate reference block neighborhood;

associate a cost with the candidate reference block obtained by comparing the reconstructed samples of the candidate reference template patch and the reconstructed samples of the target template patch;

select the candidate reference block with a minimum cost, the selected candidate reference block being associated with a geometry transform type identifying a geometry transform; and generate an intra-prediction block for the target block by applying the geometry transform identified by the geometry transform type associated with the selected candidate reference block, to reconstructed samples of the selected candidate reference block.

13. The device of claim 12, wherein the processor is further configured to:

adjust the search area according to the geometry transform type and a location of the target block in the video picture.

14. The device of claim 12, wherein for each current geometry transform type indicating either a geometry transform of a set of geometry transforms or a combination of at least two of the geometry transforms, a candidate reference block neighborhood is determined according to the target block neighborhood reconstructed samples availability, and the current geometry transform type;

for each current position in the search area, reconstructed samples of a candidate reference template patch of a candidate reference block located in the current position of a search area, is obtained and a cost is associated with the candidate reference block located at the current position of the search area;

in response to all the positions in the search area having been considered, another geometry transform type is considered, in response to all the geometry transform types having been considered, the selected candidate reference block is the candidate reference block with a minimum cost.

15. The device of claim 12, wherein for each current position in the search area, a current geometry transform type indicating either a geometry transform of a set of geometry transforms or a combination of at least two of the geometry transforms is considered, a candidate reference block neighborhood is determined according to the target block neighborhood reconstructed samples availability, and the current geometry transform type;

reconstructed samples of a candidate reference template patch of a candidate reference block located in the current position of a search area, are obtained;

a cost is associated with the candidate reference block located at the current position;

in response to all the geometry transform type having been considered, another current position in the search is considered;

in response to all the positions in the search area having been considered, the selected candidate reference block is the candidate reference block with a minimum cost.

16. The device of claim 12, wherein for each current geometry transform type indicating either a geometry transform of a set of geometry transforms or a combination of at least two of the geometry transforms is considered, a current position in the search area is considered, a candidate reference block neighborhood is determined according to the target block neighborhood reconstructed samples availability, and a geometry transform type;

for each current position in the search area, reconstructed samples of a candidate reference template patch of a candidate reference block located in the current position of a search area, are obtained and a cost is associated with the candidate reference block located at the current position of the search area;

in response to all the positions in the search area having been considered, the selected candidate reference block is the candidate reference block with a minimum cost.

17. The device of claim 12, wherein a cost associated with a candidate reference block is evaluated by a Sum of Absolute Difference between transformed and re-ordered samples of a reference template patch and the reconstructed samples of the target template patch.

18. The device of claim 12, wherein the geometry transform type indicates at least one of or a combination of at least two of:

a horizontal flipping;

a vertical flipping;

a rotation; or an identity, wherein a rotation angle of the rotation is a multiple of 90°.

19. The device of claim 12, wherein the processor is further configured to:

signaling the geometry transform type associated with the selected candidate reference block.

20. The device of claim 12, wherein the processor is further configured to:

encode a block of the video picture based on the intra-prediction block of the target block; or decode a block of the video picture based on the intra-prediction block of the target block.

* * * * *